United States Patent
Vilcauskas et al.

(10) Patent No.: US 9,509,766 B2
(45) Date of Patent: Nov. 29, 2016

(54) AUDIO OWNERSHIP SYSTEM

(76) Inventors: Andy Vilcauskas, Tualatin, OR (US);
Bryan Hunter, Portland, OR (US)

( * ) Notice: Subject to any disclaimer, the term of this patent is extended or adjusted under 35 U.S.C. 154(b) by 0 days.

(21) Appl. No.: 11/153,754

(22) Filed: Jun. 14, 2005

(65) Prior Publication Data

US 2005/0240295 A1   Oct. 27, 2005

Related U.S. Application Data

(62) Division of application No. 10/087,274, filed on Mar. 1, 2002, now abandoned.

(60) Provisional application No. 60/273,290, filed on Mar. 1, 2001.

(51) Int. Cl.

| | |
|---|---|
| *G06F 17/00* | (2006.01) |
| *H04L 29/08* | (2006.01) |
| *G06F 21/10* | (2013.01) |
| *G06Q 30/06* | (2012.01) |
| *H04L 29/06* | (2006.01) |
| *G06F 17/30* | (2006.01) |
| *G11B 20/00* | (2006.01) |

(52) U.S. Cl.
CPC ....... *H04L 67/104* (2013.01); *G06F 17/30749* (2013.01); *G06F 21/10* (2013.01); *G06Q 30/06* (2013.01); *H04L 29/06* (2013.01); *H04L 67/42* (2013.01); *H04L 69/329* (2013.01); *G06F 17/3074* (2013.01); *G06F 17/30743* (2013.01); *G11B 20/00086* (2013.01); *H04L 67/1063* (2013.01)

(58) Field of Classification Search
CPC .... G06F 3/16; G06F 17/30749; G06F 21/10; G06F 17/00; G06F 17/3074; G06Q 30/06; G11B 20/10527; G11B 20/00086; G11B 27/105; G11B 2020/10546; H04H 60/04; H04L 29/06; H04L 29/08072; H04L 29/0809; H04L 69/329; H04L 67/104; H04L 67/42; H04L 67/1063
USPC ................ 709/217–219, 227, 229, 231, 203; 705/50, 51, 54, 57, 59, 26.1, 1; 700/741, 94
See application file for complete search history.

(56) References Cited

U.S. PATENT DOCUMENTS

| | | | | |
|---|---|---|---|---|
| 5,457,746 | A | * | 10/1995 | Dolphin .......................... 705/51 |
| 5,616,876 | A | | 4/1997 | Cluts |
| 5,636,276 | A | * | 6/1997 | Brugger .......................... 705/54 |
| 5,809,246 | A | | 9/1998 | Goldman |
| 6,011,758 | A | * | 1/2000 | Dockes |
| 6,385,596 | B1 | | 5/2002 | Wiser et al. |
| 6,385,614 | B1 | | 5/2002 | Vellandi |
| 6,397,189 | B1 | | 5/2002 | Martin et al. |

(Continued)

FOREIGN PATENT DOCUMENTS

CA    2338414    2/2000

OTHER PUBLICATIONS

Applicant's admitted prior art, p. 1,line 5-p. 3; page 6, lines 7-8.*

(Continued)

*Primary Examiner* — Xu Mei
(74) *Attorney, Agent, or Firm* — Chernoff Vilhauer McClung & Stenzel, LLP (57) ABSTRACT

System for providing music to users.

4 Claims, 11 Drawing Sheets

(56) References Cited

U.S. PATENT DOCUMENTS

| | | |
|---|---|---|
| 6,480,961 B2 | 11/2002 | Rajasekharan et al. |
| 6,502,194 B1 | 12/2002 | Berman et al. |
| 6,564,253 B1 | 5/2003 | Stebbings |
| 6,567,847 B1* | 5/2003 | Inoue .......................... 709/219 |
| 7,130,892 B2* | 10/2006 | Mukai .......................... 709/219 |
| 2001/0023403 A1 | 9/2001 | Martin et al. |
| 2002/0002541 A1 | 1/2002 | Williams |
| 2002/0116082 A1* | 8/2002 | Gudorf .......................... 700/94 |

OTHER PUBLICATIONS

Applicant's admitted prior art, p. 1, line 5-p. 3.*

* cited by examiner

| EXCHANGE LIMITATIONS | |
|---|---|
| 150 | TIME |
| 152 | COST OF COMPACT DISK COMPARED TO SELECTED ONE |
| 154 | SIGN UP FEE PAID BY USER |
| 156 | TYPE OF MEDIA |
| 158 | GENRE |
| 160 | USER PREFERENCES |
| 162 | LENGTH OF AUDIO RECORDING |

AUDIO OWNERSHIP SYSTEM

This application is a division of U.S. patent application Ser. No. 10/087,274, filed Mar. 1, 2002, now abandoned, which application claims the benefit of U.S. Provisional App. No. 60/273,290, filed Mar. 1, 2001.

BACKGROUND OF THE INVENTION

The present invention relates to a system for providing music to users.

The traditional technique for selecting music involves listening to the radio and remembering which artists are most appealing to the listener. The listener then may go to the store to purchase a compact disc, tape, or album containing that music. Unfortunately, the compact disk frequently contains numerous songs that the listener does not like. Accordingly, often the listener obtains a compact disk with one, and possibly two, songs which are enjoyable. Further, an artist releases a new compact disc which the listener becomes aware of. Without listening to the songs the listener purchases the compact disc with the expectation that the music will be enjoyable. Unfortunately, the compact disk will periodically be completely devoid of any enjoyable songs. After obtaining a compact disc that is no longer wanted, the user typically sells the compact disk on the secondary market at a substantial discount.

Internet based music retailers, such as www.amazon.com sell compact disks to potential customers. To increase sales and to partially alleviate the unknown quality of the songs for their customers, Internet based music retailers may provide samples of selected songs. This permits the potential customer to make a more informed decision regarding whether to purchase a particular compact disk by listening to the songs prior to purchasing the compact disk. While this is an improvement, the samples of the songs may be misleading as to the nature of the complete song and many songs on the compact disk do not include a sample. In addition, many compact discs do not include any samples at all. Moreover, the customer may have to wait several days for the compact disk to arrive. Further, after purchasing a compact disc that the listener does not like, the purchaser either relegates the compact disk to the drawer or otherwise sells the disk on the secondary market at a substantial discount. Accordingly, the customer may be unsatisfied with his purchase.

Other online retailers provide individual compressed digital audio music files for downloading and purchase by customers. While permitting the downloading of desirable songs without purchasing the entire album, the customer is unable to return the digital audio file for return of the purchase price nor is able to lawfully transfer the digital audio file to others.

Other Internet based services provide peer-to-peer music sharing service. One such service is www.napster.com (as it existed Jan. 1, 2001). Users of the music service sample the music on their compact disks thereby creating compressed music files, such as a motion picture experts group audio layer 3 files, typically referred to as MP3 files. The audio compression from an "uncompressed" compact disk is typically performed by an audio "ripping" program. After compression, the files are typically stored on the user's hard drive. Upon signing into the music sharing service, the compressed audio files on each user's hard drive are made available to all of the other users. In this manner, different users may listen to different music by downloading and listening to the songs available from other users. This provides a convenient technique for sampling different music that the listener may not have otherwise listened to. Unfortunately, the music that is being downloaded may be compressed at different sampling rates, which results in the audio having different qualities. In addition, re-compressing the compressed audio at another sampling rate does not result in as high of recording quality as if the song was originally sampled at the desired sampling rate. Because the system is a peer-to-peer file transfer system, with the server merely providing the network address of the audio files, the actual quality of the compressed audio is unknown. In addition, frequently the compressed audio files do not include the entire song. Further, the download speeds of the compressed audio are limited by the data transfer rate of the network connection of the other user, which is not within the control of the user downloading the compressed audio. Accordingly, it may take substantial time to download the desired audio files. The user may likewise be unable to locate a desired song because it is currently unavailable from other users. Moreover, peer-to-peer audio file servers may require suitable licenses to comply with the current United States Copyright Laws.

What is desired, therefore, is a convenient system for permitting users to listen to selected audio files.

DETAILED DESCRIPTION OF THE PREFERRED EMBODIMENT

After considering the limitations of selecting music and the inherent file quality and quality of service limitations, the present inventors came to the realization that a different paradigm should be developed. The current paradigm of providing songs based on peer-to-peer connections of user's downloading and storing the audio files on their hard drives should be modified to a paradigm based upon providing server based content, where the quality of the audio files and the service are more closely controlled. The current paradigm should likewise be modified to a paradigm based upon ownership of the music so that all the artists are properly compensated for their work. However providing audio files with ownership rights of selected songs, or otherwise one or more compact disks, would typically require sending the compact disk to the user and electronically transferring the selected audio files. After listening to the compact disk the user may then resell the compact disk at a discount. In addition, providing the compact disk to the user typically uses the postal service which is prohibitively expensive, and returning the compact disk to an Internet based buyer likewise typically uses the postal service which is prohibitively expensive. In a similar way, it is time consuming to travel to a music store to purchase a compact disc and thereafter travel back to a used music store to sell the compact disc for typically less than one-half of what the customer paid for it.

Figure 1:
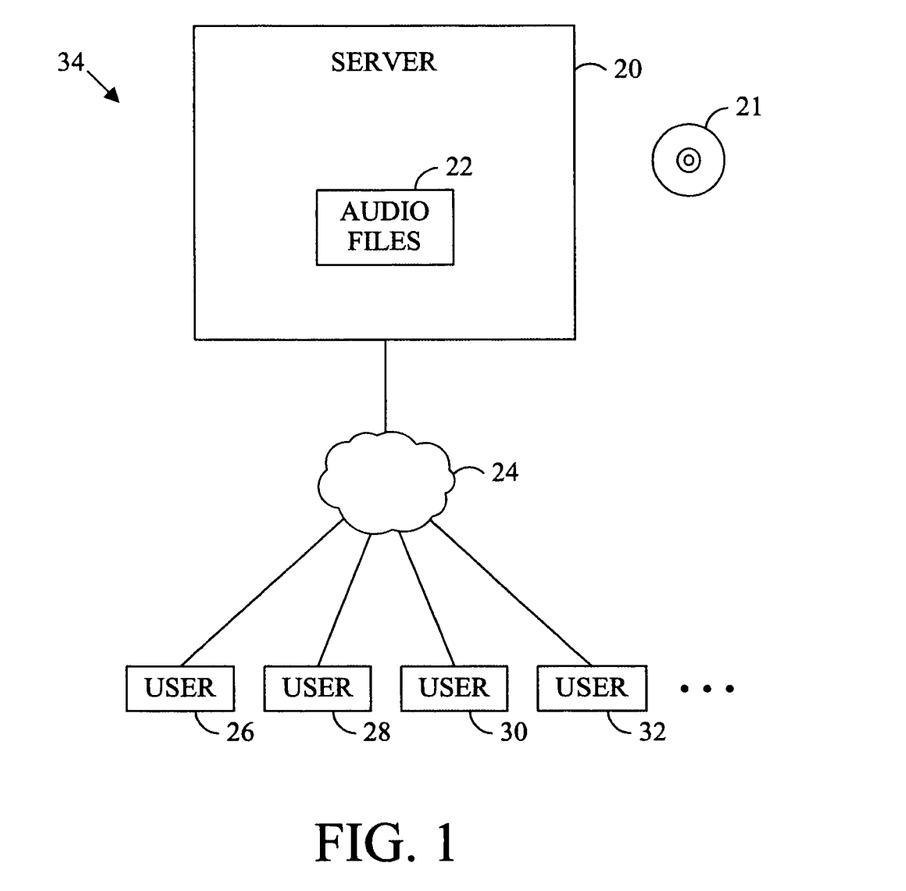
FIG. 1 is a network based audio file system.

Referring to FIG. 1, a server 20 stores compressed audio files 22 and is interconnected to the Internet 24. It is to be understood that the Internet may be any type of computer network which permits communication between multiple computing devices, such as computers. The audio files 22 are preferably obtained from a compact disk, record, tape, or other medium 21 at a first sampling rate or as an analog audio signal. The songs from the compact disk or otherwise are compressed to a size smaller than they would have been had the file not been compressed. In other words, typically the songs are sampled at a lower sampling rate than they were originally sampled at when stored on the compact disk. For analog music signals the songs are sampled at the desired sampling rate. Multiple users 26, 28, 30, and 32 may be interconnected to the Internet 24 to facilitate communication with the server 20. For each of the audio files 22 stored on the server 20 a corresponding copy of the compact disk or other medium is owned, or otherwise a license to the content is obtained, by the system provider 34 (e.g., an entity that provides the audio files for the user). In essence, for each set of songs from a single album or compact disk, the provider 34 has purchased the rights to that copy of the songs and the corresponding digital copy of those songs that are stored on the server 20 as the audio files 22.

Figure 2:
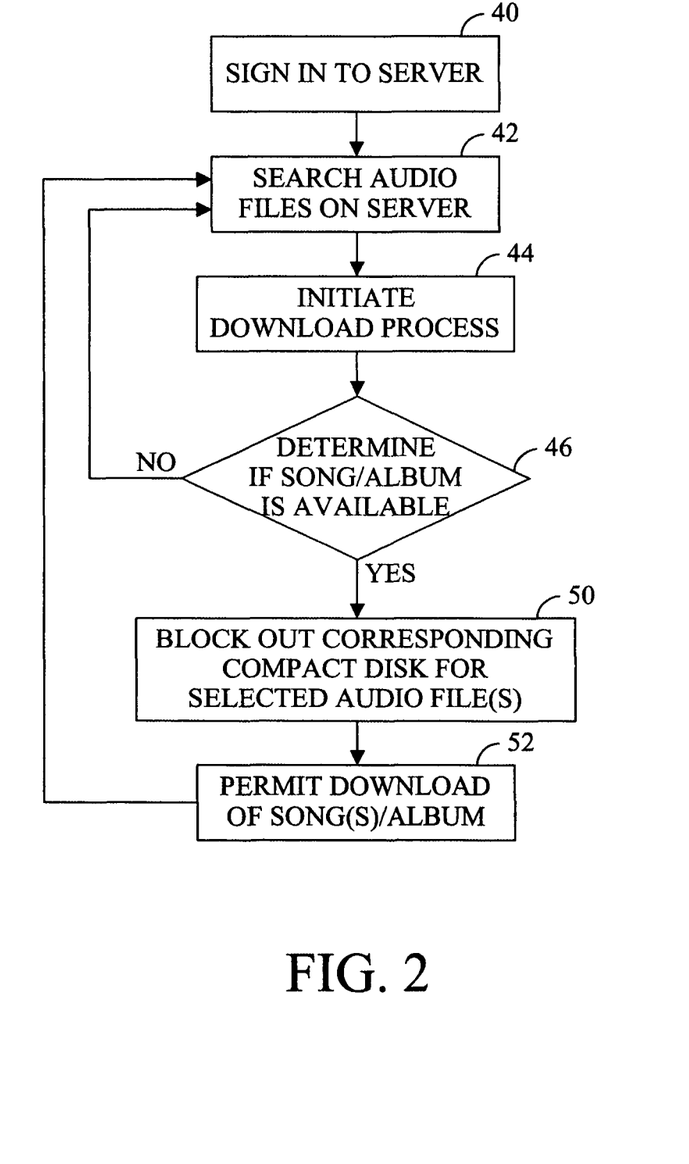
FIG. 2 is a block diagram of one embodiment of an audio file system.

Referring also to FIG. 2, the user may initially sign into the server 20 to listen to and download desirable audio files 22 at block 40. The user may search the audio files 22 on the server 20 at block 42 by any suitable technique, such as for example, artist, name of album, name of song, name of composer, name of producer, genre, etc. After locating a suitable song(s), album, or file the user may initiate the downloading or listening process at block 44 for the desired song file 22 from the server 20. Initially the server 20 determines if that song, other songs, or other files from the album are currently downloaded or in use by another user at block 46. If the song or other songs from the album are currently downloaded, in use, or being downloaded by the same or another user, then the system determines if a sufficient number of copies or licenses are owned by the provider 34 to permit another download. In this manner, for each copy of a song, or a song on a particular album or compact disc, a corresponding copy of the compact disk, license, or otherwise, is verified as being owned by the provider 34. It is to be understood that when reference is made to a particular album, compact disc, digital media, digital rights, tape, license, group of associated songs, group of audio files for which a license to use has been obtained, or otherwise ownership is obtained or otherwise established, that it is referring collectively to the entire group, even if not explicitly stated. The song and/or album is determined to be available or not available at block 46. If the song or album is determined to be available at block 46, while a copy of the song or multiple songs from the same album are being downloaded by a particular user, the corresponding copy of the compact disk or license is "locked out" or otherwise made unavailable to other users at block 50, if no further ownership rights are available. In this manner, the owners of any copyrights in the audio content are compensated for their contribution because only one digital copy, albeit compressed, of that content which was obtained by the provider 34 is provided to any user at any particular time. If a copy of the song or any songs on the corresponding album are not downloaded, not being downloaded by others, and/or otherwise the service provider 34 has a license or ownership interest in another copy of (or the only copy of) the content, then the user is permitted to download a copy of the content at block 52. Upon downloading the content and/or otherwise selecting content to be downloaded or streamed, the corresponding compact disk or otherwise is indicated as "unavailable." In this manner, audio content is made available to users in a convenient manner where quality may be maintained. The provider 34 may "rip" or otherwise obtain the digital audio files 22 with a desired sampling rate where the completeness of the audio files are guaranteed. The provider 34 may maintain physical control over the media 21 and may or may not provide the physical media 21 to the user, if desired.

Figure 3:
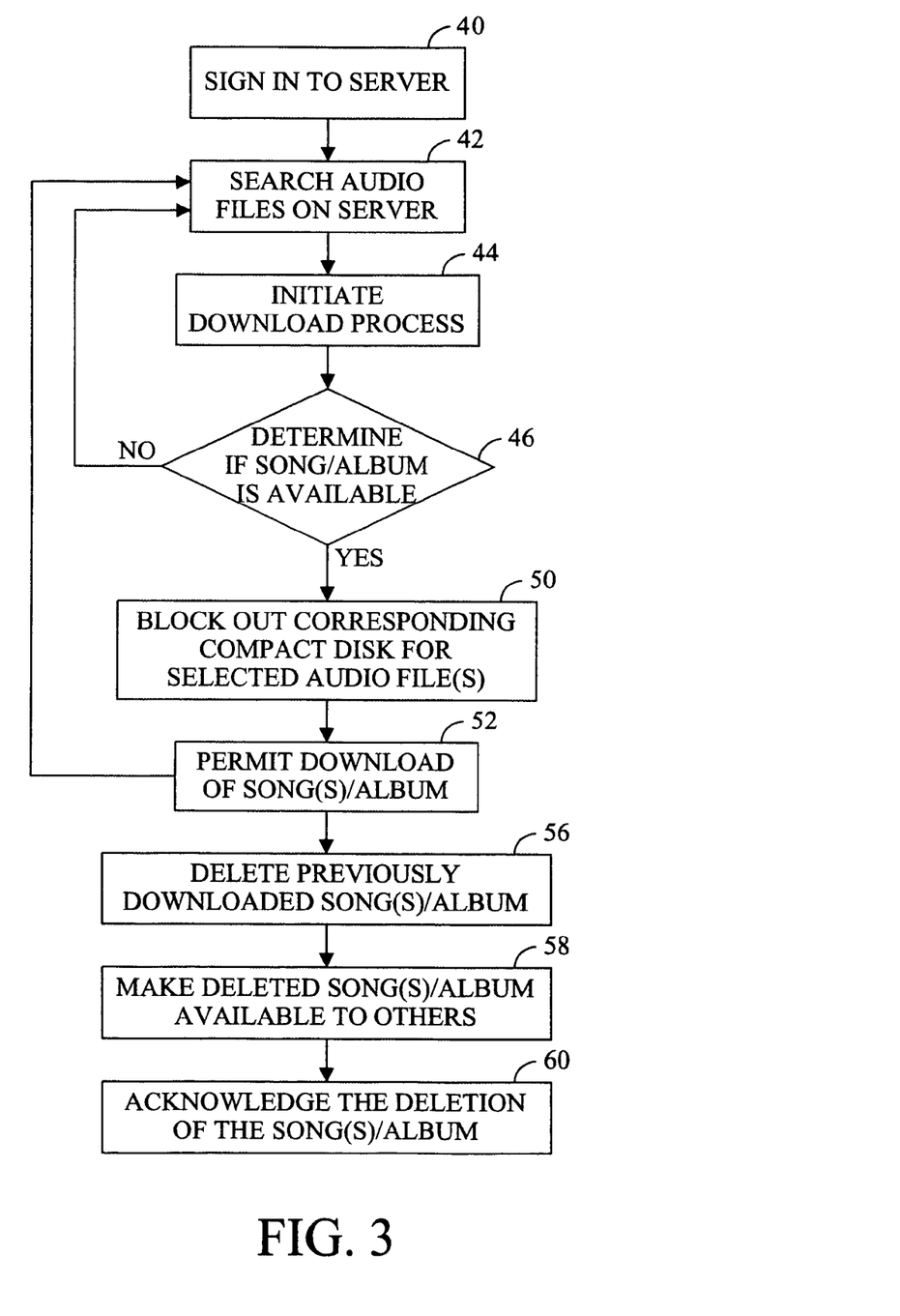
FIG. 3 is a block diagram of another embodiment of an audio file system.

Referring to FIG. 3, (a further embodiment) after the user has completed downloading the song, any other songs on the same album, or licensed songs, the user may desire to search for other songs on different albums. Prior to downloading or streaming a song or digital file from a different album, the user may delete, if desired, the copy of the previous song(s) downloaded from the server 20 at block 56. Upon deleting the previously downloaded song(s)/files, that corresponding compact disk (license or other media) that was "locked out" is then made available to other users at block 58. After deleting the previously downloaded audio files, and preferably acknowledging the deletion of the audio files at block 60, the user may start downloading or streaming additional song(s)/files from a different album. In this manner, digital copies of songs may be provided to a user without violation of the copyright owner's interest in the content because only a single copy of a particular song or album, for which a legitimate ownership interest has been obtained, is downloaded/streamed or otherwise the ownership interest has been transferred, at any particular time, albeit preferably in a compressed digital form. In the event that there is sufficient bandwidth, the digital files do not need to be compressed.

Figure 4:
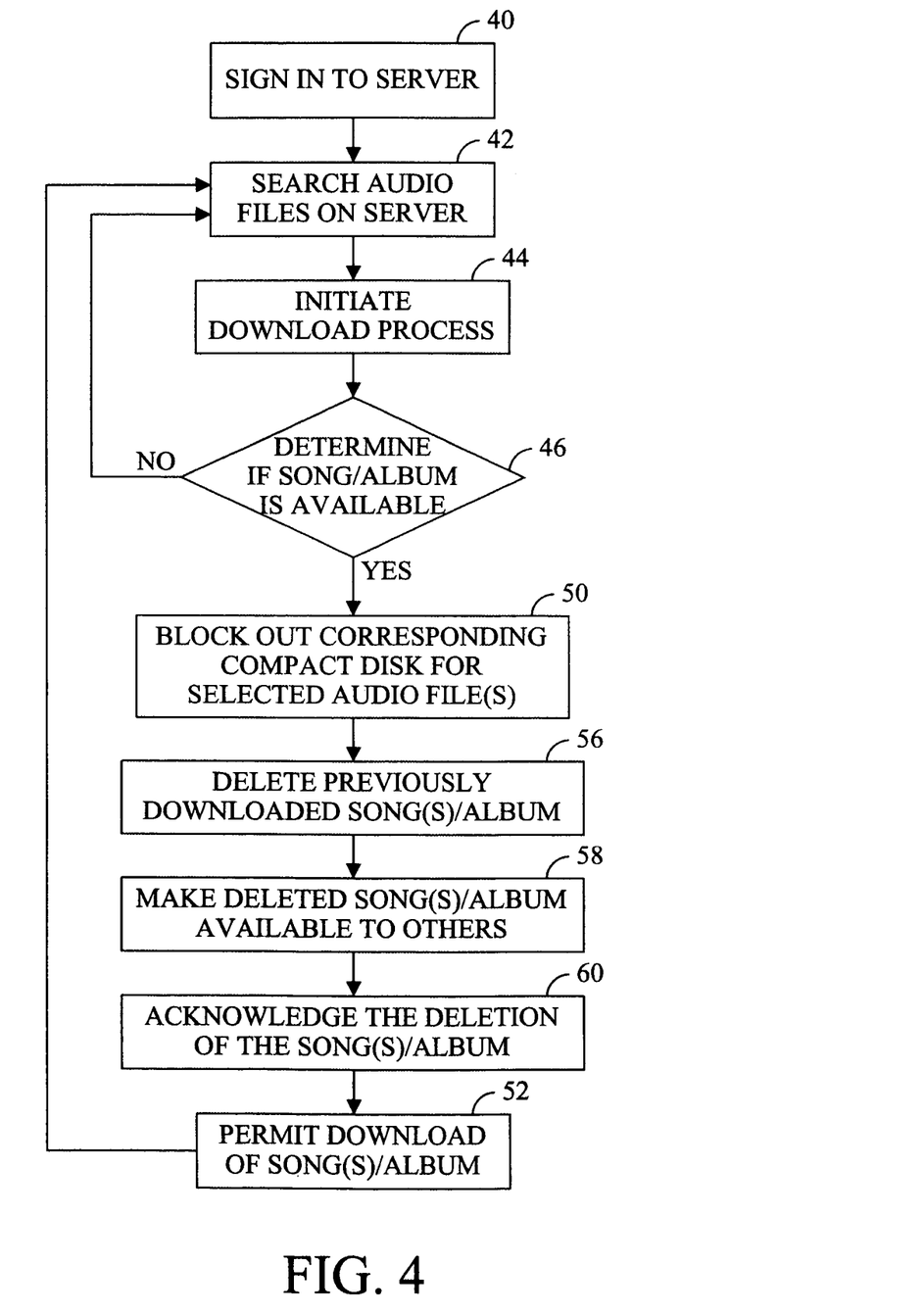
FIG. 4 is a block diagram of another embodiment of an audio file system.

After consideration of the process by which the audio files are made available to the user, the present inventors realized that by rearranging the order of the processes may result in a decrease in the number of compact discs (i.e., media) or licenses for which ownership rights need to be obtained. Referring again to FIG. 3, if the corresponding disk is blocked out at block 50 and permitted to be downloaded at block 52, there exists the possibility that considerable time may elapse before the user actually acknowledges the deletion of the previously downloaded song(s)/album at block 56. Referring to FIG. 4, it is preferable that the deletion at block 56, the acknowledgment at block 60 (if provided), and the make available at block 58 are performed prior to permitting downloading of the newly selected audio files at block 52. In this manner there is a reduced likelihood of multiple audio files from different albums being "locked out" for a significant period of time.

Figure 5:
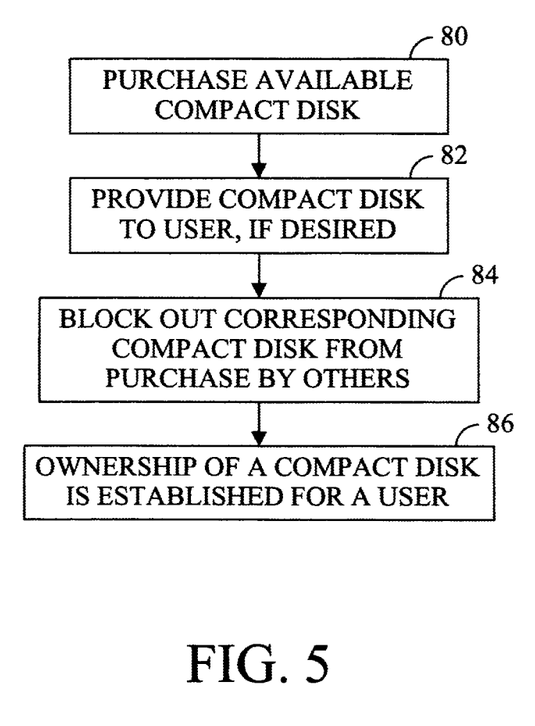
FIG. 5 is a block diagram of another embodiment of an audio file system.

Referring to FIG. 5, the system may include a membership or fee based subscription service. Prior to signing into the server at block 40 (see FIG. 2), the user purchases a compact disk (or other media/digital rights) at block 80, such as for example, from the service provider 34 or other source. The purchase price may include for example, the retail price of the compact disk, and an account setup fee. In this manner, the ownership rights of a particular compact disk (or other media/digital rights) are attributed to a particular user, while the service provider 34 maintains physical control over the compact disk or license on behalf of the user. Since the transaction may be considered a sale or otherwise a purchase, the system may provide the option for providing the compact disk to the user at block 82. In this manner, the compact disk is available to the user, if desired. If the compact disk or license is stored by the service provider 34, then the corresponding compact disk or license is "locked out" or otherwise made unavailable from being purchased by other users at block 84. Accordingly, ownership of a compact disk is established for a user at block 86 by their purchase thereof. Alternatively, the rights to the audio content may be purchased or otherwise established in any other manner. For example, a license may be obtained without the purchase of the compact disk itself, a compact disk, digital file, digital rights, or otherwise may be provided to the service provider 34 to establish ownership rights of the content, a compact disk may be inserted into a computer to establish the ownership of the installed compact disk, or otherwise establish an ownership interest in the media. Preferably, the ownership interest is sufficient to transfer the ownership interest to others by a gift, sale, transfer, or otherwise.

Figure 6:
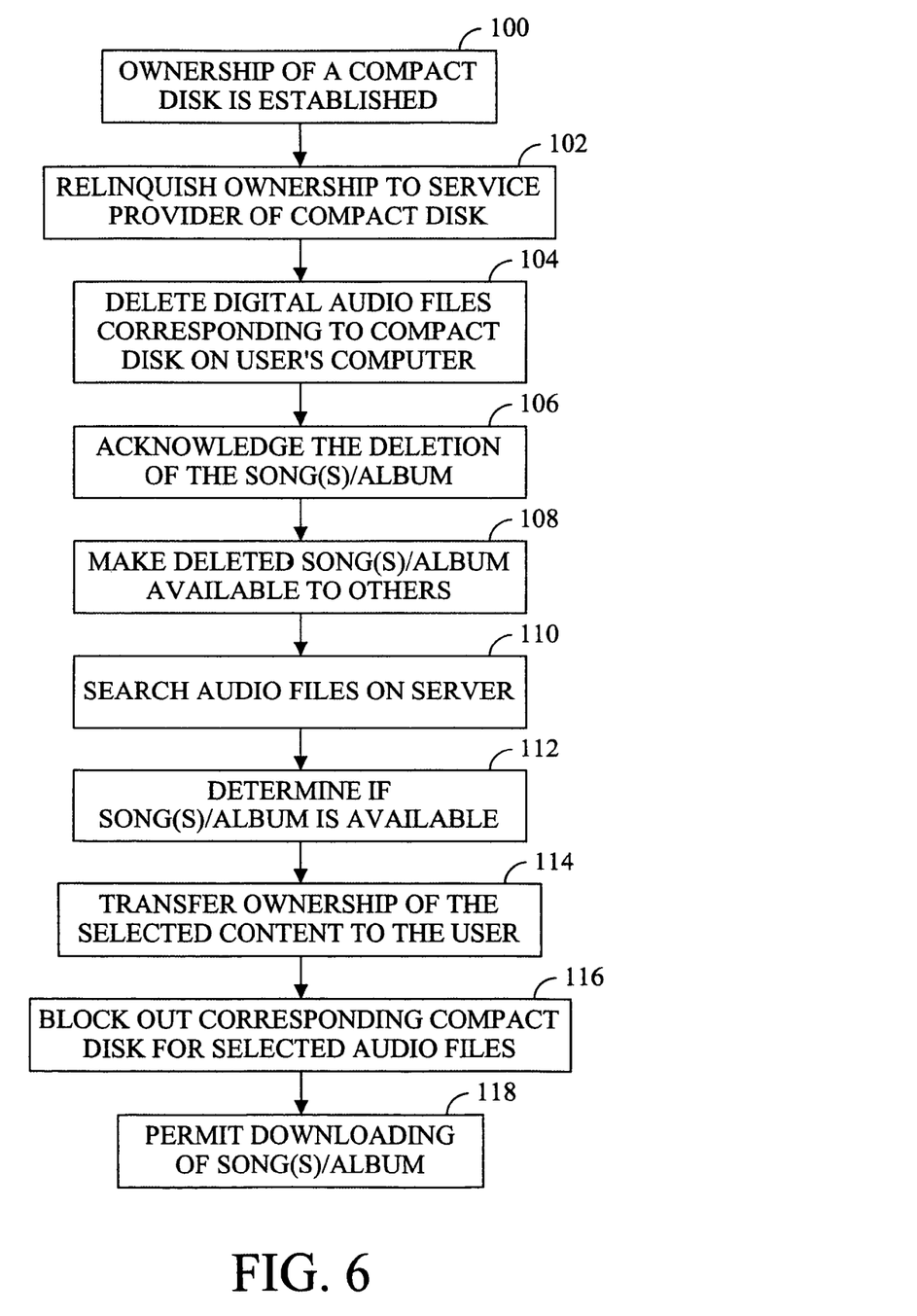
FIG. 6 is a block diagram of another embodiment of an audio file system.

Referring to FIG. 6, ownership of a compact disk (or otherwise the medium) for a user is established at block 100 in any manner. The user may relinquish ownership of the compact disk to the service provider 34 at block 102. This relinquishment may be performed, for example, by selling the compact disk back to the service provider 102 and crediting the user's account. In the case of digital audio files, and the desire to fully transfer effective ownership to those audio files and corresponding compact disk, if any, the user preferably deletes the digital audio files that the user received corresponding to the compact disk that the user had an ownership right to at block 104. The user may acknowledge the deletion of the song(s)/album at block 106. It is to be understood that any other technique may be used to effectuate the "deletion" of a file, such as for example, using technology that results in the file being non-functional after an event such as listening to the file or an elapse of a period of time, removing the header portion from the file, or encoding the file so that it is no longer usable. The service provider 34 may then make the deleted song(s)/album, acknowledged if desired, available to other users at block 108. The user may search the audio files on the server 110 to locate desirable audio files. The system determines if the song(s)/album is available by having an available compact disk or otherwise rights to the media at block 112. If the song(s)/album is available at block 112 a transaction transferring ownership in the content between the user and the system is performed at block 114. The ownership transfer of the compact disk other otherwise may be performed by the user, such as for example, using a credit existing in his account, the user paying for the compact disk, the user exchanging the previously owned compact disk established at 100 for the compact disk selected at block 112, or otherwise. In essence, the system effectuates a transfer of the ownership of a compact disk (or otherwise) from the service provider 102 to the user, or it may effectuate a transfer of the ownership of a compact disk (or otherwise) from a user to another user. This transfer is preferably not in the nature of a rental, a lease, lending, or by any other act or practice in the nature of rental, lease, or lending. In that way an effective transfer of ownership, or otherwise a sale, of the content is accomplished at block 114. The corresponding compact disk (or otherwise) for the selected audio content is blocked out at block 116. With the effective transfer at block 114 and the blocking out of the compact disk (or otherwise) at block 116, the download of the song(s)/album/or otherwise may be effectively performed at block 118, without impinging on any prohibition against a transfer that is in the nature of a rental, a lease, lending, or the like, prohibited under the Copyright Act, 2001. After downloading the content obtained at block 118, the digital audio may be exchanged again, in any manner, as desired.

In the preferred embodiment, the user is permitted to download audio files originating from a single compact disk, album, or otherwise, for which a corresponding compact disk or otherwise is "locked out" from being provided to another user. If the user desires to simultaneously download or otherwise maintain copies of audio files from multiple compact disks or otherwise then the service provider 34 would "lock out" multiple compact disks or otherwise, namely, one or more compact disks or otherwise that collectively contain all of the audio files that are currently selected, downloaded, or being downloaded by the user. In this manner, the artists rights in this music is protected from unauthorized downloading or otherwise misappropriation of their works without proper compensation.

It is to be understood that the user may purchase or otherwise establish ownership for multiple compact disks or otherwise, if desired. In that manner, the user does not need to delete all of the downloaded audio files, but only the portion corresponding to the compact disk or otherwise that the user is transferring ownership back to the service provider 34 or the user is transferring ownership to another user. This permits the user more flexibility in the selection of audio content without deletion of any files that has been lawfully obtained.

The digital audio content may be provided to the user in any suitable format desired. For example, some of the existing file formats include, MP3, Liquid Audio, Real Player, MPEG 1, MPEG 2, and wav files. In addition, the digital audio content may be provided as "streaming" media which is listened to as the media is being provided to the user.

Figure 7:
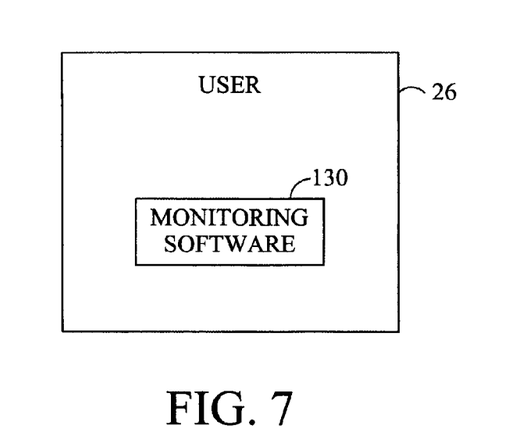
FIG. 7 is a block diagram of monitoring software for use with the audio file system.

Referring to FIG. 7, the system may include monitoring software 130 installed, otherwise operating on the user's computer, or available to the user through a networked connection, to assist in the selection of suitable songs. The monitoring software 130 may include an interface that permits the searching for and selection of songs by artist, genre, lyrics, year, decade, title of album, title of song, or any other suitable search criteria. If desired, the monitoring software 130 may track the downloading of songs for one or more albums obtained from the server 20 and where the corresponding digital files are stored by the user. Thereafter, when the user desires to download additional audio files from other compact disks, the system may automatically delete the previously downloaded audio content so that the corresponding compact disk may be made available to other users.

Figure 8:
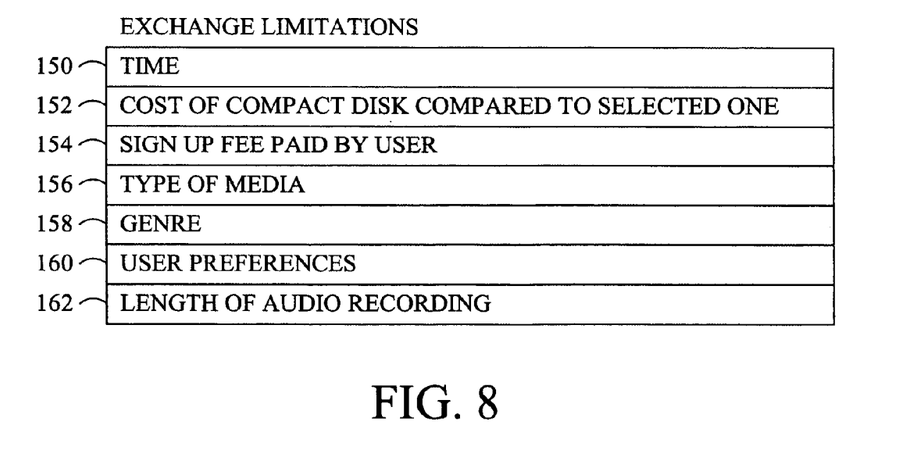
FIG. 8 is a block diagram of exchange limitations for use with the audio file system.

The exchange of audio files using the server may be further limited or otherwise modified by other criteria. Referring to FIG. 8, the criteria may include a limited time during which the user is permitted to listen to the audio content at block 150. In this manner, the purchase, transfer of the ownership, or otherwise will only be valid for a limited time duration, such as 2 hours. This likewise permits the service provider 34 to maintain a smaller collection of compact disks because the corresponding audio content is not "checked out" to a particular user for an extended period of time. The time limitation may be based upon, the user's voluntary agreement to delete the songs after a time duration, the monitoring software 130 deleting the songs, a time indication provided with the audio file indicating the time during which the file may listened to and other times the file being rendered inoperable, or otherwise any suitable technique.

It may be observed that this system of exchanging or otherwise transferring ownership rights to digital audio files corresponding to compact disks, or otherwise media rights, results in a system that permits users to listen to a wide selection of different songs. In this manner, the system may be free from the necessity to purchase or otherwise obtain licenses from the copyright holders apart from the license that comes with the purchase of the media.

The criteria may include a comparison between the value of the compact disk currently purchased or otherwise attributed to the user, and the value of the compact disk or otherwise from which songs are desired, at block 152. This permits the system provider 34 to avoid situations in which the user purchases a relatively inexpensive compact disk and exchanges that compact disk with a relatively expensive compact disk, thereby depriving the service provider 34 or another user of adequate compensation. Likewise, if the user purchases a relatively expensive compact disk and exchanges that compact disk with an relatively inexpensive compact disk, the user's account may be credited or the user reimbursed in some suitable manner.

The criteria may include limitations based on the sign up fee paid by the user. In general, different number of albums, files, or otherwise may be provided, more extensive selections, and greater flexibility if the user pays a relatively higher fee at block 154.

The criteria may include limitations based upon the type of the media at block 156, such as for example, analog tape, 8-track, laser disc, compact disk, album, super audio compact disk, digital audio disc, etc. In this manner, the system may compensate for the expense of purchasing the corresponding media, with compact disks tending to be more expensive than tapes. In one example, the trading for some users may be limited to audio tapes.

The criteria may include the genre of the music being listened to at block 158. The popular music in some genres, such a rock, tend to be transitory in nature so that the album is in high demand for a limited period of time therefore resulting in the service provider 34 purchasing of many copies of the corresponding media. However, after a limited period of time, the album will tend to be relatively unpopular after which the service provider 34 will have a large collection of corresponding media without any corresponding demand. After this occurrence, the service provider 34 may sell the corresponding media at a considerable loss. In contrast, genres that have a stable demand will not result in such temporary over purchasing of corresponding media and therefore will tend to be less expensive for the service provider 34.

The criteria may include user preferences at block 160 by which the user selects exchange and usage limitations. The user preferences may be used as the basis for determining the fee criteria for the exchanging of audio files or otherwise.

The criteria may include the length of the audio files, number of audio files exchanged or otherwise downloaded, or otherwise the number of audio files on a particular compact disk(s) at block 162. Similarly, this criteria may permit the service provider 34 to adjust the fee schedule based upon the bandwidth for file transfer that the user will be using to download the songs.

Figure 9A:
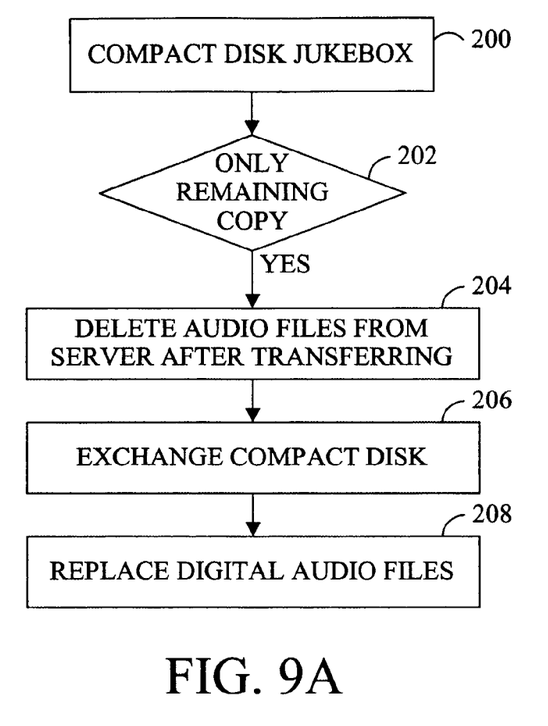
FIG. 9A is a block diagram of a further embodiment of an audio file system.

The present inventors determined that there may be copyright ownership considerations relating to the simultaneous storing of compressed digital audio files, such as MP3 files, on the server, transferring the ownership of the compact disk or otherwise to the user, permitting downloading or streaming of the digital audio files to the user, still maintaining the digital audio files on the server after the transfer has occurred without another copy of the compact disk being owned by the service provider 34 or other users, and maintaining backups of the digital audio files. In essence, the service provider 34 may have transferred ownership of the compact disk or otherwise and the corresponding digital files or otherwise but might retain a copy of the digital files on the server. Referring to FIG. 9A, the service provider 34 may store one or more of the compact disks in a compact disk jukebox 200 or other system that makes the physical compact disk available on demand. In the event that the downloading of the digital audio files and the corresponding digital audio files represent the only remaining copy of the corresponding compact disk owned by the service provider 34 (block 202), then the service provider 34 may delete the digital audio file after transferring the digital audio file to the user at block 204. In this manner, only one single copy of the digital audio file and possibly a backup of that digital audio file will be maintained corresponding to a single compact disk. After the user exchanges the compact disk at block 206 the digital audio files may be "ripped" from the compact disk at block 208 to the server or possibly retrieved from a backup copy to replace the digital audio files previously deleted. In addition, the user could likewise retransfer the digital audio files back to the server, if desired. However, for each compact disk where the service provider 34 has multiple copies of the same disk, the service provider 34 may only need to "rip" one set of digital files, which could result in substantial time and cost savings. Moreover, with the "ripping" of the digital audio files being performed by the service provider 34 the quality and completeness of the digital audio files may be maintained.

Figure 9B:
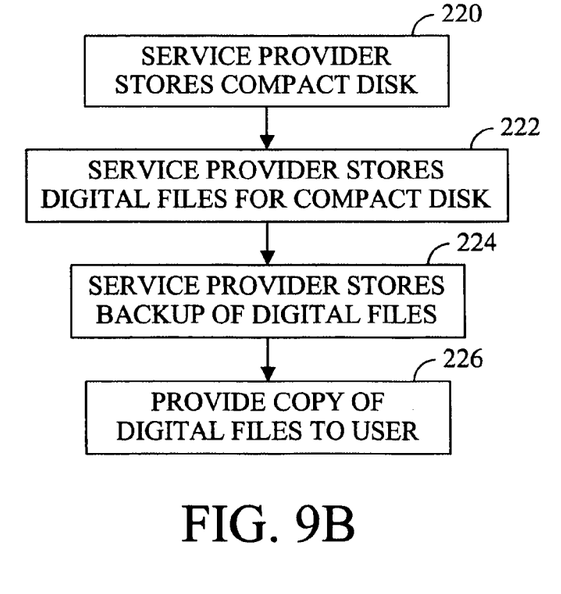
FIG. 9B is a block diagram of a further embodiment of an audio file system.

Referring to FIG. 9B, the service provider 34 stores or otherwise has ownership rights in an assortment of compact disks at block 220. The service provider 34 likewise may store digital audio files corresponding to the compact disks at block 222. Further, the service provider 220 may likewise have internal backups of the digital audio files at block 224. The user may download the digital audio files from the provider 34 at block 226. In the event that an insufficient number of a particular compact disk is not "locked out" or otherwise available to other users, such as the last copy of the compact disk is provided to a user at block 226, then the service provider 34 may be considered to be storing a backup copy of the digital audio files on the server 20 on behalf of the user. In this manner, when the user exchanges the particular compact disk the server 20 may use the previously stored backup of the digital audio files for other users. Accordingly, the system may permit the last compact disk to be "locked out" while retaining a backup copy of the digital audio files on the server 20 to alleviate the need to "rip" another set of digital audio files from the compact disk.

Figure 10:
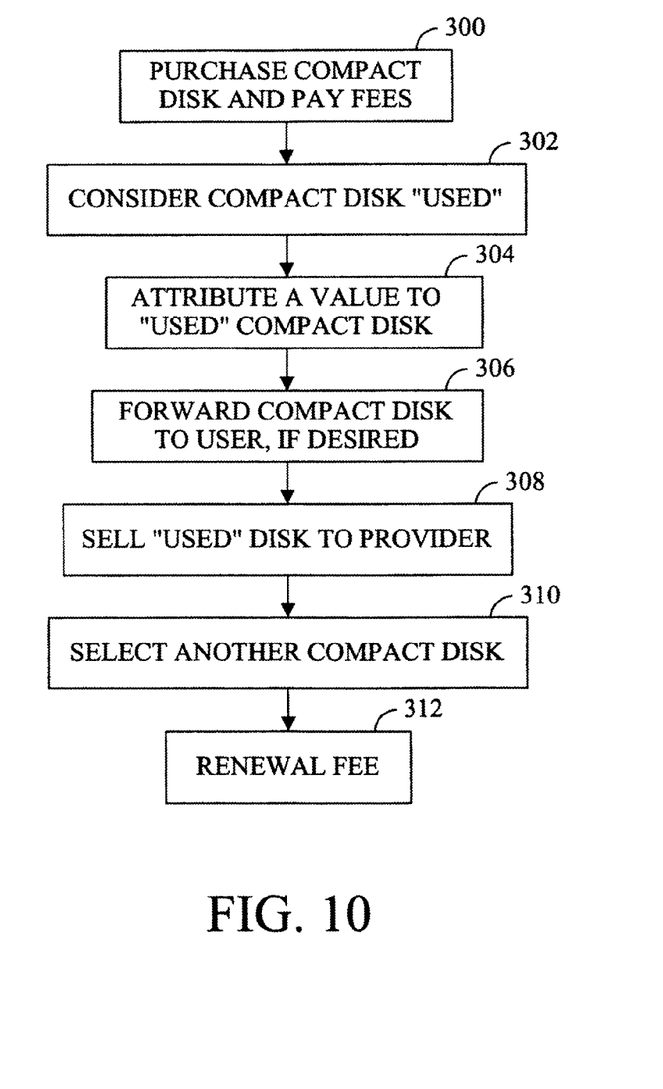
FIG. 10 is a block diagram of a further embodiment of an audio file system.

Referring to FIG. 10, the service provider 34 may provide an annual or other periodic subscription model for operating the service business. For example, the user may initially purchase a compact disk or other, and pay an account setup fee and/or renewal fee at block 300 and/or other fees. The purchase of the compact disk may be at a retail price or other suitable price. The fee for the compact disk may likewise vary based on the price of the compact disk selected. The account setup fee, may be for example, a one time fee for creating an account on the system. The renewal fee may be a periodic fee, such as monthly, quarterly, annually, etc., for access or otherwise using to the system. After a period of time, such as an annual time, the system may consider the purchased compact disk as a "used" compact disk, even though the actual compact disk may not have been actually removed from its packaging or otherwise used in the traditional sense at block 302. The compact disk assigned a "used" value may be the disk the user has currently exchanged for, the compact disk or other purchased when setting up the account, or otherwise any suitable disk or media right. A value may be attributed to the "used" compact disk at block 304. The user may have the option of having the "used" compact disk forwarded to them, with the addition of shipping and handling charges, if desired at block 306. If the user does not desire to have the compact disk forwarded, such as at the end of a renewal period, then the "used" value of the compact disk may be credited to his account by selling the compact disk to the service provider 34 or another user at block 308. The user may then select another compact disk for the next period of time, such as an annual time, at block 310. The service provider 34 may charge the user a fee for the renewal, which may include for example, a renewal fee and the price of the new disc minus the "value" of the "used" compact disk, at block 312. In this manner, the user has the option of selling the "used" compact disk, if desired. In addition, the user may have the option of crediting the sale of the "used" compact disk toward the purchase of a new compact disk for the next time period. In other words, this effectuates a sale of the compact disk or otherwise being stored by the service provider 34 and likewise permits the user to purchase another compact disk or otherwise from the service provider 34 or another user.

Figure 11:
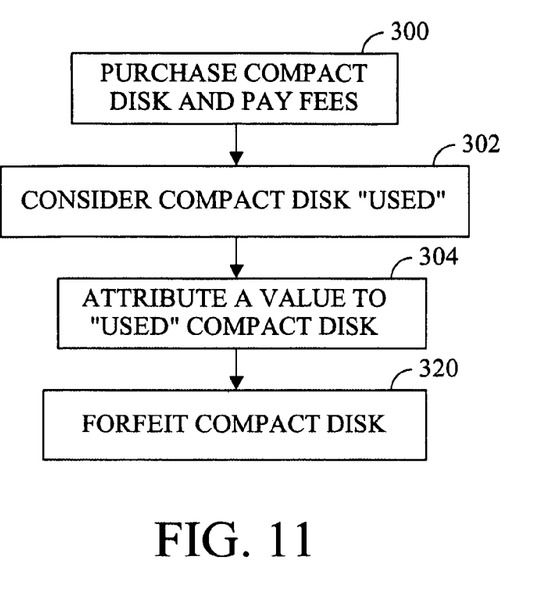
FIG. 11 is a block diagram of a further embodiment of an audio file system.

Referring to FIG. 11, another option for termination of the annual subscription is to provide for forfeiture of the compact disk or otherwise. The forfeiture may be automatic, in the event that the user can not be contacted, or in the event that the user does not renew or otherwise agree to pay for the shipping and handling. In this manner, the compact disk or otherwise may become property of the service provider 34 and the agreement with the user will be terminated.

Figure 12:
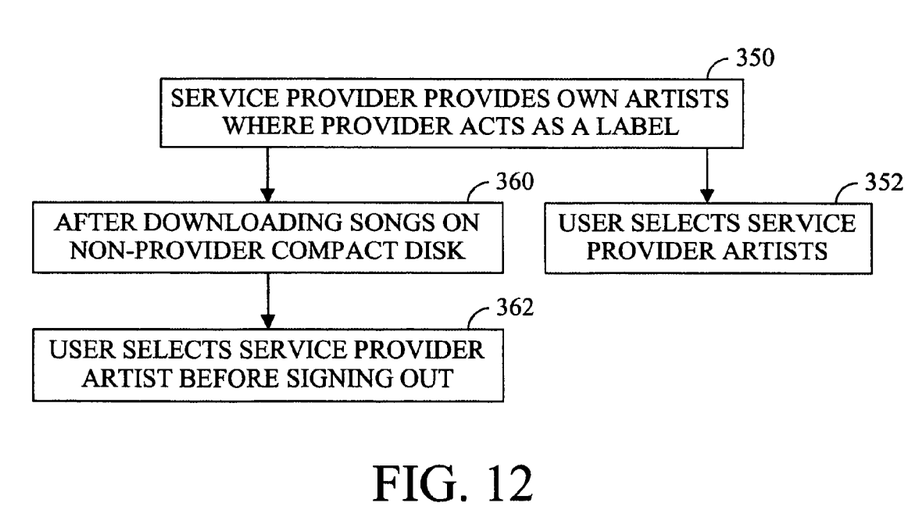
FIG. 12 is a block diagram of a further embodiment of an audio file system.

Referring to FIG. 12, the service provider 34 may sign up its own artists and act in the capacity of a record label itself. In this manner, the service provider 34 may be the owner of all of the copyright rights in the music, to the extent possible under current Copyright Laws of the particular jurisdiction. The service provider 34 artists may likewise include artists where the service provider 34 is alleviated from having to pay the normal royalties owed the copyright owners if the music was provided in a typical manner, such as by radio or other broadcast. In general, the artists provided by the service provider 34 will incur less royalties than would have normally otherwise because of contractual relationships with the artists or other copyright holders. The service provider 34 may provide the option to users of sampling its own artists at block 350. The user may select one of the service provider 34 artists at block 352. The user may, after downloading (e.g., purchasing) songs on non-service provider 34 compact disks at block 360, select to exchange the currently downloaded audio files for one of the service provider 34 artists at block 350 before signing off the service. In this manner, the time between uses of the system by the user during which the user may be "parked" on expensive compact disks or other expensive audio files is minimized. This may reduce the expense of the available digital files for the service provider 34. This frees up additional audio files for other users and reduces the inventory required by the service provider 34 to provide a full selection.

The preferred embodiments envision that the audio files may be transferred by some type of file transfer or streaming media. In addition, the audio files may be free from encryption that limits their use, copyright water marking, proprietary formats for a particular system, a file encryption that inhibits copying of the file, a file encryption that inhibits or otherwise limits the number of copies that may be made, time limited durations, etc. In this manner, the audio files are freely transferable from one system to another, while operating properly. In addition, the system may use streaming audio content where instead of transferring digital audio files the audio content is streamed in a continuous fashion to the user's computer, while the user simultaneously listens to the content as it is being streamed or otherwise listens to the content at later time. Moreover, the server 20 may simultaneously stream and download the file to the user. In addition, the audio files may be provided to the user in a manner that requires modification of the audio file after downloading prior to listening to the file. In this manner, the distribution of the audio files may be more readily controlled, if desired. If desired, the audio files may be directly provided via an e-mail or likewise to the user or otherwise made available for downloading from the server. The server may make the audio files available in an "in box" or other user account that resides on the server. In this manner, the audio files are made available and the user may selectively download the desirable audio files. After the audio files are exchanged, transferred, sold, or otherwise relinquished or transfer ownership thereof, the server may simply remove access to the audio files from the user's "in box" or the user's account.

Figure 13:
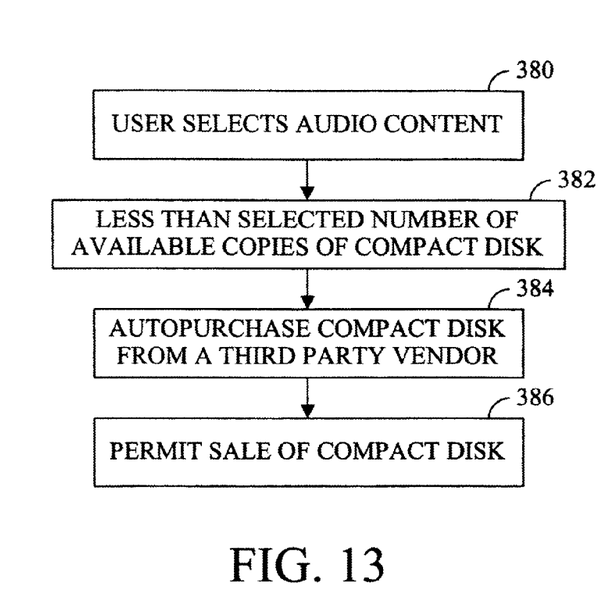
FIG. 13 is a block diagram of a further embodiment of an audio file system.

Referring to FIG. 13, the user may select audio content at block 380. If the system determines that less than a selected number of copies of the compact disk are available, such as zero, one, two, etc., then the system at block 382 may desire to obtain additional copies or otherwise rights to more audio files. While ordering additional compact disks or digital rights through the mail is possible, it is prohibitively time consuming when a customer desires the audio files at that time. To overcome this limitation, a computer networked based automatic purchasing agent may be used to purchase an additional compact disk or other rights at block 384. In the event that there were no additional copies or otherwise rights to audio files available from the server (or less than the desired number), the audio files are permitted to be downloaded or otherwise purchased at block 386 after the automated purchasing agent has secured the rights to additional copies of the compact disks or ownership rights.

The system may track the exchange of audio files for particular users. In this manner valuable statistical data is obtained that may be used for any suitable purpose, including the selection of additional audio files. The data may include, for example, popularity of particular compact disks, popularity of particular songs on particular compact disks, popularity of songs/compact disks as a function of the time of day, groups of albums that are likely desirable by the same user by monitoring user's exchanges, popularity of songs/compact disks as a function of the region of the country, popularity of songs/compact disks as a function of the age of the user, popularity of songs/compact disks as a function of the sex of the user, popularity of songs/compact disks as a function of the demographics of the user, popularity of songs/compact disks as a function of the income of the user, popularity of songs/compact disks as a function of the duration the audio files were purchased by the user, popularity of songs/compact disks as a function of whether the corresponding compact disk or single was purchased, popularity of songs/compact disks as a function of the artist, popularity of songs/compact disks as a function of the genre, popularity of songs/compact disks as a function of the year, popularity of songs/compact disks as a function of the decade/year the compact disk was released, and popularity of songs/compact disks as a function of the decade/year the compact disk was recorded.

Figure 14:
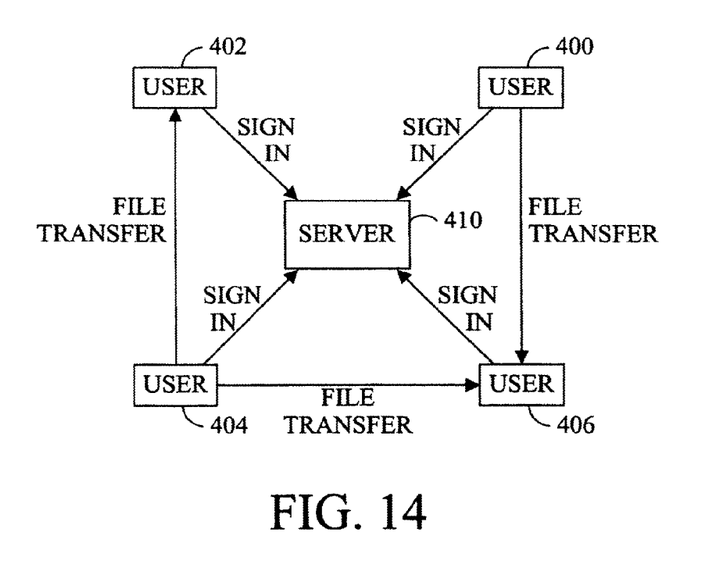
FIG. 14 is a block diagram of a further embodiment of an audio file system.

Referring to FIG. 14, in another embodiment the system may be used in a peer-to-peer environment where different users 400, 402, 404, and 406 sign into the server 410. The users preferably provide a list of available audio files to the server 410 or to all, or a selected set of, the other users which can be exchanged with other users. The users may then search the server to locate other users that have desirable audio files for downloading from the other user. In this manner the server 410 acts as a clearing house for available audio files for transfer between users. In addition, the server 410 likewise preferably tracks which files each of the users has ownership rights in. In addition, the sever 410 may be implemented in the manner of a distributed server residing on one or more of the user's computers. When a user desires to obtain ownership rights to another compact disk or otherwise, the server 410 or otherwise distributed server "locks" out a corresponding compact disk or otherwise makes available audio ownership rights for the user transferring a copy of the audio files from the other user. In this manner, the server 410 acts as an ownership clearing house for the audio ownership rights. In a similar manner, user's may transfer ownership rights of audio files back to the server 410, or others users, and obtain new audio files from other users, while the server 410 or other user provides the user downloading the file with the proper ownership rights to the media. In this manner, the server 410 (or other users) acts as a clearing house for audio files while the actual files are being transferred from other users, as opposed to the server itself.

The system shown in FIG. 14, may be extended to eliminate the server, where the user's perform the exchange between themselves. In this manner, the user's will transfer the digital audio files between themselves while likewise providing the compact disk or otherwise to the other user. Alternatively, the user may store the compact disk on behalf of the user obtaining the digital audio files. Further, the user providing the digital audio files preferably deletes any copies of the files that he has after transfer.

In addition to audio files, the system may be used to transfer other types of digital files. Such digital files may include digital video content, computer software, or any other type of digital content.

The user may likewise purchase a compact disk from the service provider 34 which is shipped to the user, and the corresponding digital audio files are provided to the user with the compact disk or otherwise provided to the user through a computer network.

What is claimed is:

1. A method comprising the steps of:
   (a) maintaining a plurality of physical storage mediums, each storage medium storing a plurality of copyrighted artistic works, and each of said storage mediums also storing a copy of the same plurality of copyrighted artistic works, such that an ownership interest in each copyrighted artistic work is obtained;
   (b) storing a plurality of digital files on a server connected to the Internet, each of said digital files corresponding to said same plurality of copyrighted artistic works;
   (c) providing the ownership interest in a selected one of said physical storage mediums to a user while retaining said selected physical storage medium;
   (d) transferring at least one of said plurality of digital files to said user over the Internet;
   (e) prohibiting transferring any of said copyrighted artistic works of said selected one of said physical storage mediums to another user when the ownership interest corresponding to the said copyrighted artistic work is being used by one or more other users, until the one or more users deletes the previously transferred file or files.

2. The method of claim 1 where each of said physical storage mediums is a compact disc and each of said copyrighted artistic works is a track of said compact disc.

3. The method of claim 2 where each of said tracks on said physical storage medium is encoded at a first bit-rate and each of said digital files on said server is recorded at a second bit-rate.

4. The method of claim 3 where said second bit-rate is less than said first bit-rate.

\* \* \* \* \*

UNITED STATES PATENT AND TRADEMARK OFFICE
CERTIFICATE OF CORRECTION

| | |
|---|---|
| PATENT NO. | : 9,509,766 B2 |
| APPLICATION NO. | : 11/153754 |
| DATED | : November 29, 2016 |
| INVENTOR(S) | : Andy Vilcauskas and Bryan Hunter |

It is certified that error appears in the above-identified patent and that said Letters Patent is hereby corrected as shown below:

In the Specification

Column 7, Line 12:
Change "may listened to" to --may be listened to--.

Column 7, Line 33:
Change "with an relatively" to --with a relatively--.

Signed and Sealed this
Twenty-second Day of May, 2018

Andrei Iancu
*Director of the United States Patent and Trademark Office*